United States Patent
Buschmann et al.

(10) Patent No.: US 10,259,659 B2
(45) Date of Patent: Apr. 16, 2019

(54) PRODUCTION MODULE, PRODUCTION SYSTEM, AND METHOD FOR OPERATING A PRODUCTION MODULE

(71) Applicant: SIEMENS AKTIENGESELLSCHAFT, München (DE)

(72) Inventors: Frank Buschmann, München (DE); Wendelin Feiten, Neubiberg (DE); Gisbert Lawitzky, München (DE); Michael Pirker, Lenggries (DE); Kai Wurm, München (DE); Vladimir Zahorcak, Borinka (SK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/548,165

(22) PCT Filed: Feb. 9, 2015

(86) PCT No.: PCT/EP2015/052642
§ 371 (c)(1),
(2) Date: Aug. 2, 2017

(87) PCT Pub. No.: WO2016/128020
PCT Pub. Date: Aug. 18, 2016

(65) Prior Publication Data
US 2018/0029803 A1    Feb. 1, 2018

(51) Int. Cl.
*B65G 43/08* (2006.01)
*G05B 19/418* (2006.01)

(52) U.S. Cl.
CPC ......... *B65G 43/08* (2013.01); *G05B 19/4189* (2013.01); *G05B 2219/31274* (2013.01); *Y02P 90/28* (2015.11)

(58) Field of Classification Search
USPC ....................................................... 700/230
See application file for complete search history.

(56) References Cited

U.S. PATENT DOCUMENTS 6,665,572 B2 * 12/2003 Buervenich ............ B22D 11/16
700/100
2003/0149501 A1    8/2003 Tuszynski
(Continued)

FOREIGN PATENT DOCUMENTS

CN         1623301 A    6/2005
CN      101141489 A    3/2008
(Continued)

OTHER PUBLICATIONS

Hadeli et al: "Multi-agent coordination and control using stigmergy"; Computers in Industry: Elsevier Science Publishers; Amsterdam NL; Bd. 53 No. 1; pp. 75-96; XP004472757; ISSN: 0166-3615; DOI:10.1016/S0166-3615(03)00123-4; Jan. 1, 2004.
(Continued)

*Primary Examiner* — Kyle O Logan
(74) *Attorney, Agent, or Firm* — Schmeiser, Olsen & Watts, LLP (57) ABSTRACT

Provided is a production module for processing or handling a product in a production system, which production module has a product detection module for reading in product parameters associated to the product, and an interaction module for assigning an adjacent production module to a transfer port. Furthermore, a local assignment table is provided, in which non-adjacent conveying objectives in the production system are in each case assigned to one of the transfer ports. A balancing module serves for iterative reading of first assignment information of a corresponding assignment table of a first adjacent production module, for iterative formation of the local assignment table with the aid of the read-in first assignment information, and for iterative
(Continued)

transfer of second assignment information of the local assignment table to a second adjacent production module.

15 Claims, 2 Drawing Sheets

(56) References Cited

U.S. PATENT DOCUMENTS

| | | |
|---|---|---|
| 2005/0141448 A1 | 6/2005 | Bolinth |
| 2005/0209836 A1 | 9/2005 | Klumpen et al. |
| 2015/0151921 A1* | 6/2015 | Collot .................. B65G 43/10 700/230 |
| 2015/0205855 A1 | 7/2015 | Takahashi et al. |

FOREIGN PATENT DOCUMENTS

| | | |
|---|---|---|
| CN | 202385133 U | 8/2012 |
| CN | 103324172 A | 9/2013 |
| EA | 010003 B1 | 6/2007 |
| RU | 2321886 C2 | 4/2008 |
| RU | 90588 U1 | 1/2010 |
| WO | WO 2014021448 A1 | 2/2014 |

OTHER PUBLICATIONS

International search report dated Oct. 28, 2015; PCT/EP2015/052642; 1 pg.
Chinese Office Action for application No. 201580076103.9 dated Dec. 7, 2018.

* cited by examiner

PRODUCTION MODULE, PRODUCTION SYSTEM, AND METHOD FOR OPERATING A PRODUCTION MODULE

CROSS-REFERENCE TO RELATED APPLICATION

This application claims priority to PCT Application No. PCT/EP2015/052642, having a filing date of Feb. 9, 2015, the entire contents of which are hereby incorporated by reference.

FIELD OF TECHNOLOGY

The following relates to embodiments of a production module for processing or handling a product, a production system and a method for operating a production module which can react more flexibly to changes in the production system.

BACKGROUND

Contemporary production systems for producing or processing technical products generally have a multiplicity of specific, interacting production modules and are becoming increasingly more complex. On a product to be produced or to be processed, generally it is necessary to perform a multiplicity of processing, production or handling steps, for which a multiplicity of production modules specialized therefor, such as e.g. robots, CNC machines, 3D printers, reactors, burners, heating installations or conveyor belts, are provided in the production system. For processing purposes, the product has to be transported through the production system on a path that reaches all production modules specific to the work steps to be performed in the envisaged processing order.

It is known to provide a central unit for production control in the production system, in which central unit the production modules available in the production system and their specific functionalities are indicated and managed. These indications also comprise, in particular, the transport possibilities for products in the production system. The paths that are intended to be taken by the products to be processed through the production system are planned in the central unit. The planned paths are communicated in each case to the transport modules involved, which convey the products through the production system in accordance with these central stipulations.

However, failure, exchange or addition of a production module in the production system generally necessitates replanning of the product paths by the central unit and communication of the replanned product paths to the production modules involved. This can lead to outage times for the entire production system. Such outage times of the entire production system can also occur upon failure of the central unit.

SUMMARY

An aspect relates to a production module for processing or handling a product, a production system and a method for operating a production module which can react more flexibly to changes in the production system.

The following provides a production module for processing or handling a product in a production system having a multiplicity of production modules, and a method for operating the production module. Such a product may be for example a workpiece or product in various phases of a manufacturing, machining or processing process and, in particular, also an initial, intermediate or end product. The production module may be in particular a device of the production system that contributes to the production, machining or processing of the product, e.g. a robot, a CNC machine, a 3D printer, a reactor, a burner, a heating installation, a conveyor belt or some other transport module. According to embodiments of the invention, the production module has a product acquisition module for reading in product parameters assigned to the product, and transfer ports for handing over the product to production modules of the production system that are adjacent to the production module. An interaction module serves for allocating a respective adjacent production module to one of the transfer ports. Furthermore, provision is made of a data memory for storing a local assignment table, in which conveying destinations that are not adjacent to the production module in the production system are assigned in each case to one of the transfer ports. A balancing module serves for iteratively reading in first assignment information of a corresponding assignment table of a first adjacent production module, for iteratively setting up the local assignment table on the basis of the first assignment information read in, and for iteratively forwarding second assignment information of the local assignment table to a second adjacent production module. Furthermore, provision is made of a handover module for determining a conveying destination for the product in the production system on the basis of the product parameters read in, for selecting a transfer port assigned to the determined conveying destination in the local assignment table, and for handing over the product via the selected transfer port.

One major advantage of embodiments of the invention can be seen in the fact that there is no need for a central definition of the product transport paths in the production system. Failure, exchange or addition of a production module functioning as a conveying destination in the production system can be represented in the local assignment tables of the production modules adjacent to said production module by a corresponding change of assignments. These changed assignments can then be disseminated step by step, in each case via adjacent production modules, i.e. in each case by means of local interaction via the production system. Complete central replanning of the product paths can thus generally be avoided.

Advantageous embodiments and developments of the invention are specified in the dependent claims.

According to one advantageous embodiment of the invention, the balancing module can be configured to assign a conveying destination indicated in the corresponding assignment table of the first adjacent production module in the local assignment table to a transfer port allocated to said first adjacent production module. In this way, indications regarding the adjacent production modules via which a respective conveying destination can be reached can be disseminated step by step by local interaction via the production system.

Furthermore, the first assignment information, the second assignment information and/or the local assignment table can assign to a conveying destination a physical constraint that has to be fulfilled by the product on a transport path to said conveying destination. The handover module can then be configured to balance the physical constraint with the product parameters read in and, in a manner dependent thereon, to perform the determination of the conveying destination and/or the selection of the transfer port. Such a physical constraint can comprise e.g. indications about a maximum permissible weight and/or maximum permissible dimensions of the product for the transport path to said conveying destination. If the product does not satisfy the physical constraint for a respective conveying destination or a respective transport path, a different conveying destination or a different transport path can be determined independently by the production module.

The balancing module can furthermore be configured to link the physical constraint assigned to a conveying destination in the first assignment information with a local physical constraint of the production module and to assign the linked physical constraint to the conveying destination in the local assignment table and in the second assignment information. In this simple way, indications about cumulative effects of physical constraints of specific production modules and/or transport paths can be disseminated step by step, by local interaction via the production system.

Preferably, the first assignment information, the second assignment information and/or the local assignment table can assign to a conveying destination outlay information about a conveying outlay with respect to said conveying destination, functionality information about a functionality of said conveying destination, availability information about an availability of the functionality and/or change information about a change in the functionality or the availability. This allows current, possibly changed, indications about a respective conveying destination with regard to the conveying outlay, such as e.g. conveying time, conveying costs and/or conveying resources, with regard to the functionality, such as e.g. drilling, welding, milling, transporting, and/or with regard to the availability to be disseminated step by step, by local interaction via the production system.

The handover module can be configured to perform the determination of the conveying destination and/or the selection of the transfer port depending on the outlay information, functionality information, availability information and/or change information assigned to the conveying destination. In this way, the production module, on the basis of a functionality required for a subsequent processing step, a respective conveying outlay and/or a current availability of the functionality, can independently decide to where the product is handed over.

Preferably, the availability information can comprise a time indication about a period of time in which the functionality is available or about a point in time of a change in the functionality or the availability.

Furthermore, the outlay information assigned to the conveying destination can comprise a transport time with respect to said conveying destination. The handover module can then be configured to perform the determination of the conveying destination and/or the selection of the transfer port depending on the time indication and the transport time. This allows an optimization of the transport times with respect to the conveying destination.

According to one advantageous embodiment of the invention, the balancing module can be configured to assign a conveying destination indicated in corresponding assignment tables of a plurality of first adjacent production modules, on the basis of outlay information respectively assigned therein, to a transfer port in the local assignment table that is allocated to an adjacent production module with a minimum conveying outlay with respect to said conveying destination. Alternatively or additionally, the balancing module can be configured to create, for a conveying destination indicated in corresponding assignment tables of a plurality of first adjacent production modules, a plurality of entries in the local assignment table with respectively assigned outlay information. In this case, the handover module can be configured to select a transfer port that is allocated to an adjacent production module with a minimum conveying outlay with respect to said conveying destination. In this way, a respective conveying outlay with respect to a conveying destination can be locally minimized, and indications about the minimized conveying outlay by means of the second assignment information can be disseminated step by step, by local interaction in the production system.

According to one advantageous embodiment of the invention, the interaction module can be configured dynamically to detect adjacent production modules to which the product can be handed over, and to generate change information on account of such a detection. In this way, the production module can independently and flexibly react to newly coupled, changed or removed production modules and inform adjacent production modules about a new configuration by means of the generated change information. The information about the new configuration can thus be disseminated step by step, by local interaction via the production system.

Advantageously, the balancing module can be configured to perform, on account of arriving change information, an iteration step when reading in first assignment information, when setting up the local assignment table and/or when forwarding second assignment information. In this way, as a result of the arrival of the change information, it is possible to initiate an updating of the own local assignment table and of the corresponding assignment tables of adjacent production modules, such that indications about changes in the production system are disseminated step by step, by local interaction via the production system.

Furthermore, the local assignment table can contain version information that is changed on account of arriving change information and/or on account of an iteration step when reading in first assignment information, when setting up the local assignment table and/or when forwarding second assignment information. The balancing module can then be configured, when setting up the local assignment table, to compare the version information thereof with a version of the first assignment information and to update the local assignment table in a manner dependent thereon.

BRIEF DESCRIPTION

Some of the embodiments will be described in detail, with references to the following figures, wherein like designations denote like members, wherein.

DETAILED DESCRIPTION

Figure 1:
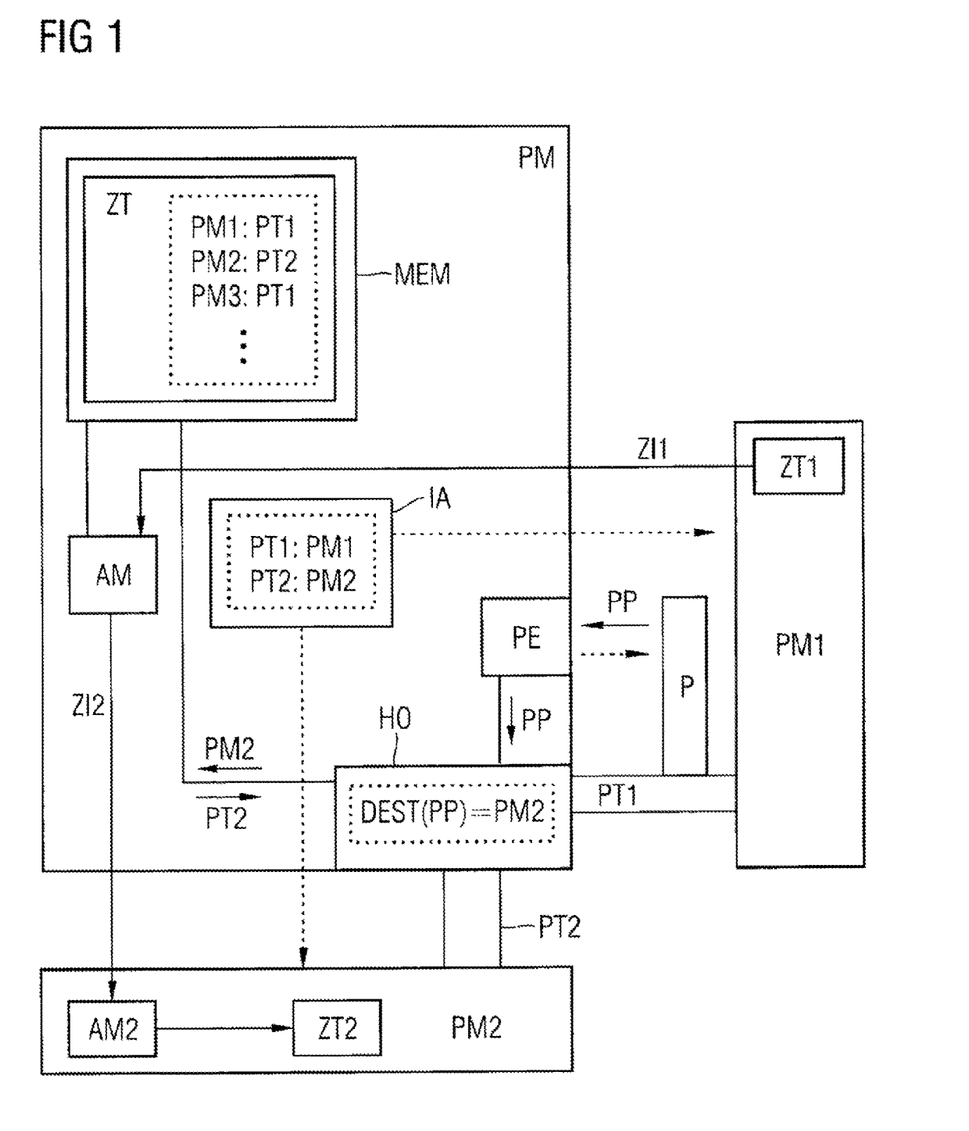
FIG. 1 shows a production module according to embodiments of the invention in interaction with adjacent production modules.

FIG. 1 illustrates a production module PM according to embodiments of the invention for processing or handling a product P in a production system. Such a production system, e.g. a manufacturing installation for producing, machining or processing workpieces or other products, generally has a multiplicity of production modules having specific functionality. The product P can be a workpiece or generally an arbitrary physical product in various phases of a manufacturing, machining or processing process, in particular also an initial, intermediate or end product.

Adjacent production modules PM1 and PM2 are adjacent to the production module PM. In this case, the adjacent production modules PM1 and PM2 may be physically or logically adjacent.

The production module PM and the production modules PM1 and PM2 adjacent to it may be in each case a device of the production system that contributes to the production, machining, processing and/or handling of the product and has a specific functionality, e.g. a robot, a CNC machine, a 3D printer, a reactor, a burner, a heating installation or a conveyor belt or some other transport module. In particular, a respective production module may be a so-called cyber-physical module (CPM) or cyber-physical production module (CPPM).

The production module PM can interact with the adjacent production module PM1 by means of a transfer port PT1 provided between PM and PM1. Accordingly, a transfer port PT2 is provided for the interaction of the production module PM with the adjacent production module PM2. The transfer ports PT1 and PT2, often also referred to as handover points, serve for handing over the product P between adjacent production modules. The transfer ports PT1 and PT2 can be defined in each case e.g. as a specific spatial region in which the product P is delivered by one production module and collected by the other production module. Alternatively or additionally, the transfer ports PT1 and PT2 can be defined in each case as a logical port at which the same spatial region is provided for handover to different adjacent production modules and different collectors or recipients of the product are differentiated by an individual port identifier.

In the present exemplary embodiment, the product P is positioned on the transfer port PT1 between the production module PM and the adjacent production module PM1. For recognizing and/or identifying the product P, the production module PM has a product acquisition module PE having a product sensor. Such a product sensor can be realized e.g. by means of a so-called RFID chip (RFID: radio-frequency identification), which reads out data from a corresponding RFID chip fitted to the product P. In particular, the product acquisition module PE, as indicated by a dotted arrow in FIG. 1, can interrogate product parameters PP from the product P that comprise e.g. indications about processing, manufacture and/or structure of the product P.

The production module PM furthermore has an interaction module IA for allocating adjacent production modules to transfer ports. In the present exemplary embodiment, the interaction module IA allocates the adjacent production module PM1 to the transfer port PT1 and the adjacent production module PM2 to the transfer port PT2. Furthermore, the interaction module IA, as indicated by dotted arrows in FIG. 1, can dynamically detect adjacent production modules, here PM1 and PM2, to which the product P can be handed over. On account of such a detection, the interaction module IA generates change information, e.g. a trigger signal, in order thereby to inform the production module PM or other adjacent production modules in the production system about addition, change or removal of an adjacent production module.

The production module PM furthermore has a data memory MEM, e.g. a database, having a local assignment table ZT stored therein. In the local assignment table ZT, production modules of the production system that can be reached from the production module PM, here PM1, PM2 and a non-adjacent production module PM3 and possibly further non-adjacent production modules, are assigned as conveying destinations in each case to one of the transfer ports, here PT1 or PT2. In the present exemplary embodiment, the transfer port PT1 is assigned to the adjacent production module PM1, the transfer port PT2 is assigned to the adjacent production module PM2, and the transfer port PT1 is assigned to the non-adjacent production module PM3. In this way, the local assignment table ZT maps a local topology of product paths leading through the production system. In this case, the local topology represents the information regarding the transfer ports via which a respective conveying destination in the production system can be reached by the product P.

The production module PM furthermore has a balancing module AM, which can read in first assignment information ZI1 from a corresponding local assignment table ZT1 of the adjacent production module PM1 iteratively and in an event-controlled manner, can set up the local assignment table ZT on the basis of the first assignment information ZI1 read in iteratively and in an event-controlled manner, and can forward second assignment information ZI2 of the local assignment table ZT to the adjacent production module PM2 iteratively and in an event-controlled manner. In the adjacent production module PM2, a corresponding local assignment table ZT2 is then updated on the basis of the second assignment information ZI2. For the adjacent production module PM2 the second assignment information ZI2 thus acts like the first assignment information ZI1 for the production module PM. The event-controlled procedures above can preferably be initiated by arriving change information. As a result of reading in the first assignment information ZI1, updating the local assignment table ZT on the basis of said first assignment information ZI1, and forwarding the second assignment information ZI2, indications about changes in the production system can be propagated and thus disseminated step by step, by local interaction via the production system.

Preferably, in each case substantially the same algorithm for the propagation of assignment information is executed locally by the balancing modules of the production modules according to embodiments of the invention of the production system. Consequently, central synchronization of all the production modules is not required.

Furthermore, the production module PM has a handover module HO, which is coupled to the product acquisition module PE and to the data memory MEM. The handover module HO serves for determining a conveying destination, here PM2, for the product P on the basis of the product parameters PP read in, for selecting a transfer port, here PT2, that is assigned to the determined conveying destination PM2 in the local assignment table ZT, and for handing over the product P via the selected transfer port PT2. Handing over the product P can comprise further conveyance by physical movement or else a logical handover, e.g. by placement at the transfer port PT2 and transmission of a signal to the collecting adjacent production module PM2. Generally, a handover of the product P should be understood to mean that the product is situated firstly in the region of action of a first production module, e.g. PM, and later in time in the region of action of a second production module, e.g. PM2. In this sense the product is handed over from the first production module to the second production module even if the second production module removes the product from the first production module.

The handover module HO receives the product parameters PP from the product acquisition module PE and determines a conveying destination DEST for the product P on the basis of the product parameters PP. In the present exemplary embodiment, the adjacent production module PM2 is determined as conveying destination DEST, i.e. DEST(PP)=PM2. In general, production modules of the production system that are not adjacent to the production module PM are also determined as conveying destinations DEST.

In the present exemplary embodiment, an indication about the conveying destination PM2 determined is communicated to the data memory MEM by the handover module HO and an indication about the transfer port, here PT2, assigned to said conveying destination in the local assignment table ZT is transmitted back to the handover module HO. On the basis of this indication, the handover module HO selects the transfer port PT2 for handing over the product P to the adjacent production module PM2.

Figure 2:
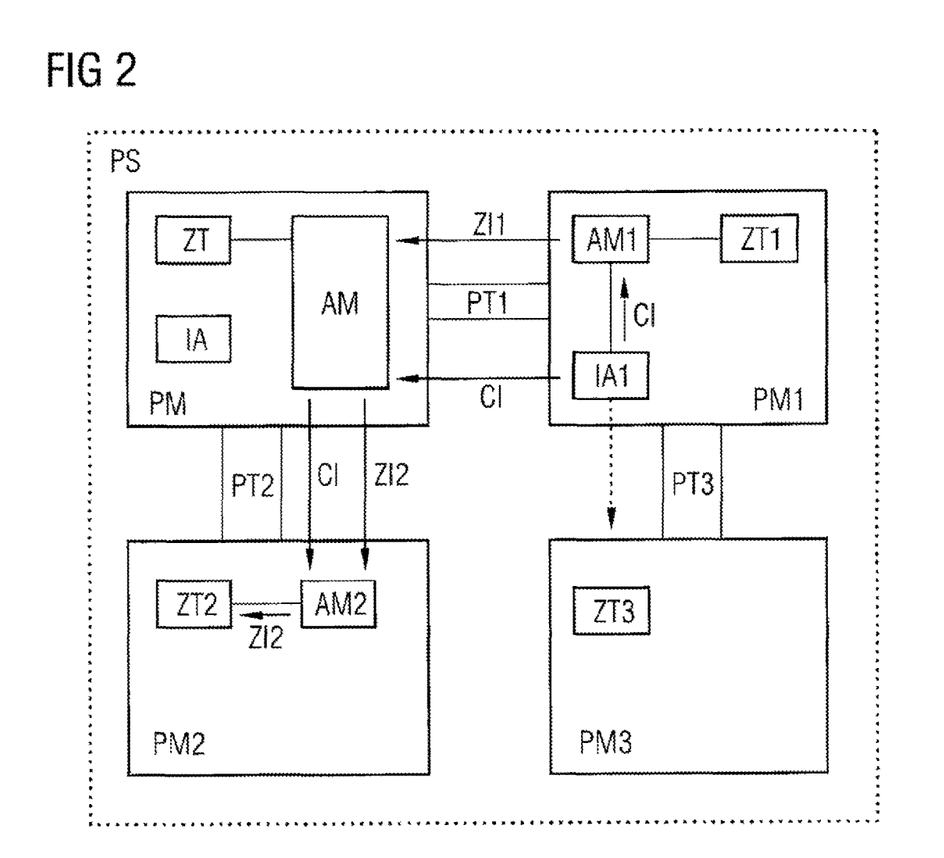
FIG. 2 shows a production system comprising a plurality of production modules according to embodiments of the invention.

FIG. 2 shows, in schematic illustration, a production system PS comprising a multiplicity of production modules PM, PM1, PM2 and PM3 according to embodiments of the invention. It should be assumed that the production modules PM, PM1, PM2 and PM3 illustrated are equipped in each case as production modules according to embodiments of the invention in a manner corresponding to the production module PM illustrated in FIG. 1. However, not all components of the production modules PM, PM1, PM2 and PM3 are illustrated in FIG. 2, for reasons of clarity.

The production module PM is coupled to the adjacent production module PM1 via the transfer port PT1 and to the adjacent production module PM2 via the transfer port PT2. Furthermore, the production module PM3 is coupled to the production module PM1 via a transfer port PT3. From the standpoint of the production module PM, the production modules PM1 and PM2 are accordingly adjacent conveying destinations, while the production module PM3 is a conveying destination that is not adjacent to the production module PM. As already explained in association with FIG. 1, the production module PM has the local assignment table ZT, the balancing module AM coupled thereto, and the interaction module IA. the production module PM1 has the corresponding assignment table ZT1, a balancing module AM1 coupled thereto, and an interaction module IA1 coupled to the balancing module AM1. The production module PM2 has the corresponding assignment table ZT2 and the balancing module AM2 coupled thereto. Finally, the production module PM3 has a corresponding assignment table ZT3. The corresponding assignment tables ZT1, ZT2 and ZT3 represent, for the production module PM1, PM2 and PM3, respectively, in each case the local assignment table thereof.

In the production system PS, products are preferably manufactured in a decentralized manner. Instructions as to how a product is to be manufactured are stored at the product and/or in a manner assigned to the product. Paths taken through the production system PS by a respective product during its production or processing do not have to be predefined, but rather can preferably be determined locally step by step. The concrete processing stations, i.e. production modules, do not have to be predefined either, but rather can be determined—preferably locally—during the production process. A conveying destination of a product may be, in particular, a specifically predefined production module, one of a plurality of production modules of a specific type or one of a plurality of production modules which offer a specific functionality. Advantageously, the production modules available in the production system PS, including the conveying means suitable for transporting products, do not have to be statically defined or known a priori, but rather can be added, exchanged or removed even during the operation of the production system PS.

For the present exemplary embodiment it shall be assumed that the production module PM3 has been newly added to the production system PS. This is dynamically detected by the interaction module IA1 of the production module PM1 adjacent to the production module PM3. This detection is indicated by a dotted arrow in FIG. 2. The interaction module IA1 consequently assigns the detected production module PM3 to the transfer port PT3, via which products can be handed over between the production modules PM1 and PM3. On account of the detection, the interaction module IA1 generates change information CI indicating that the production module PM3 is available to the production module PM1. Generally, the change information CI can comprise an indication about any change in the availability or in a functionality of the production module. In the present exemplary embodiment, the change information CI is communicated to the balancing module AM1 and to the balancing module AM by the interaction module IA1. The communication of the change information CI causes the balancing modules AM1 and AM in each case to update the local assignment table ZT1 and ZT, respectively. The change information CI here thus serves as it were as a trigger signal for the updating of the local assignment tables.

On account of the local detection of available production modules and/or functionalities, a central location in which the available production modules and their interfaces or connections are to be managed is not required in the production system PS. Rather, e.g. newly added production modules are connected to their directly adjacent production modules and the now adjacent production modules can exchange their respective local information regarding the availability of production modules and/or functionalities. By step-by-step propagation of this information about availability and functionality, which information is exchanged only among directly adjacent production modules, this information can be disseminated via the production system PS.

By virtue of the fact that a respective production module can locally ascertain to what other production modules it is adjacent and whether a transfer port to a respective adjacent production module exists, it is possible to dynamically derive an actually existing structure or topology of the production system PS from a current physical construction of the production system. Capacity adaptations of the production system PS are simplified as a result. If e.g. a production module is inserted into an existing production system, in general considerable parts of a description of the possible product paths through the production system and of the functionalities accessible to the products remain substantially unchanged. The parts of said description that are to be adapted can then be automatically adapted by local step-by-step propagation of change information.

Figure 3:
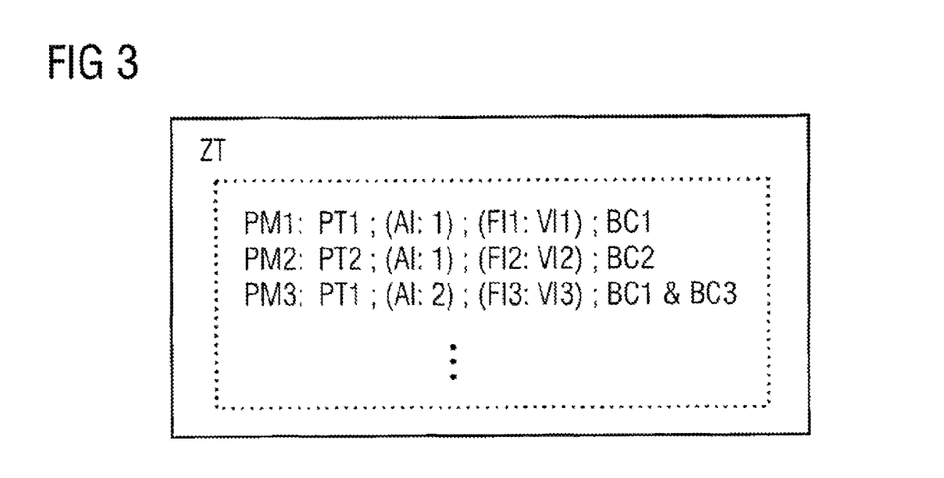
FIG. 3 shows a local assignment table of a production module according to embodiments of the invention.

FIG. 3 shows the local assignment table ZT in a more detailed illustration. The corresponding assignment tables ZT1, ZT2 and ZT3 are constructed analogously to the local assignment table ZT illustrated. In the local assignment table ZT, in each case at least one entry is provided for the conveying destinations that can be reached in the production system PS from the production module PM, here the adjacent production modules PM1, PM2 and the non-adjacent production modules PM3, . . . of the production system PS. The conveying destinations are assigned in each case a transfer port via which the product P can be handed over to an adjacent production module in order finally to reach the conveying destination.

In the present exemplary embodiment, the transfer port PT1 is assigned to the adjacent production module PM1, the transfer port PT2 is assigned to the adjacent production module PM2 and the transfer port PT1 is assigned to the non-adjacent production module PM3. The latter assignment reflects the fact that a product to be conveyed from the production module PM to the non-adjacent production module PM3 can be conveyed to the production module PM3 via the adjacent production module PM1. In this way, the local assignment table ZT reflects a topology of the production system and maps it onto local neighborhood relations.

Furthermore, a respective conveying destination is assigned outlay information AI about a conveying outlay with respect to said conveying destination. This can comprise indications about a transport time, conveying costs and/or conveying resources. In the present exemplary embodiment, the outlay information AI comprises an indication about a number of required handovers from the production module PM as far as the conveying destination. This indication represents as it were a distance to the conveying destination in the production system PS. In the present exemplary embodiment, the conveying of the product P to the adjacent conveying destinations PM1 and PM2 requires one handover in each case, while two handovers are required for conveyance to the conveying destination PM3. Furthermore, a respective conveying destination PM1, PM2 and PM3 is assigned functionality information FI1, FI2 and respectively FI3 about the functionality of the relevant production module and availability information VI1, VI2 and respectively VI3 in this regard about the availability of said functionality. In this case, the functionality may be e.g. drilling, welding, milling and/or transporting. The availability information VI1, VI2 and respectively VI3 can comprise, in particular, a time indication about a period of time when a respective functionality is actually available. Accordingly, a respective conveying destination can be assigned a transport time required for transporting the product P to said conveying destination. In general, all indications which allow a distributed implementation of so-called scheduling algorithms can be stored in the local assignment table ZT and assigned to a respective conveying destination.

Furthermore, a respective conveying destination PM1, PM2 and PM3 in the local assignment table ZT is assigned physical constraints BC1, BC2 and respectively BC1 & BC3 that have to be fulfilled by the product P on the transport path to the respective conveying destination. The physical constraints can comprise e.g. indications about a maximum permissible weight and/or maximum permissible dimensions of the product. The notation BC1 & BC3 should be understood in this case to mean that the product must fulfil both the constraint BC1 and the constraint BC3.

The handover module HO is correspondingly configured to perform the determination of the conveying destination and/or the selection of the transfer port depending on the outlay information AI, functionality information FI1, FI2, FI3, availability information VI1, VI2, VI3 and/or physical constraint BC1, BC2 or BC1 & BC3 assigned to the conveying destination.

As illustrated in FIG. 2, the balancing module AM1, on account of the arriving change information CI, generates first assignment information ZI1, which represents the change in the functionality available in the production system PS as a result of the coupling of the production module PM3. In the present exemplary embodiment, the first assignment information ZI1 comprises an entry which assigns to the production module PM3 the transfer port PT3, a distance 1 as outlay information AI, the functionality information FI3, the availability information VI3 and the physical constraint BC3. This entry is stored by the balancing module AM1 in the assignment table ZT1 for the iterative updating thereof. Furthermore, the balancing module AM1 communicates the assignment information ZI1 to the balancing module AM of the production module PM. The balancing module AM updates the local assignment table ZT on the basis of the received first assignment information ZI1 in such a way that the production module PM3 indicated therein is assigned as new conveying destination to the transfer port PT1, which was allocated to that production module, here PM1, from which the first assignment information ZI1 was received. Further, the distance 1 indicated as outlay information AI in the first assignment information ZI1 is incremented by the distance between the production module PM and the adjacent production module PM1, in order thus to determine a distance of 2 from the production module PM to the non-adjacent production module PM3. The incremented distance 2 is assigned to the non-adjacent production module PM3 as outlay information AI in the local assignment table ZT.

Furthermore, the physical constraint BC3 contained in the first assignment information ZI1 is linked with the physical constraint BC1 specific to the production module PM in order thus to obtain the linked physical constraint BC1 & BC3 for the path to the conveying destination, here PM3. The linked physical constraint BC1 & BC3 is accordingly assigned to the non-adjacent conveying destination PM3 in the local assignment table ZT. Generally, in this way e.g. a maximum weight as physical constraint for the entire path to the conveying destination PM3 can be locally determined as a minimum of the maximum weight indicated in the local assignment table ZT1 of the accepting adjacent production module PM1 and of the maximum weight specific to the production module PM. Such a maximum weight can also be determined depending on a geometric position of the transfer port and/or leverages prevailing there. Analogously thereto, a cumulative effect of constraints regarding the geometric dimensions of a product can be determined and stored in the local assignment table.

The balancing module AM generates the second assignment information ZI2 on the basis of the first assignment information ZI1 and/or the local assignment table ZT. The second assignment information ZI2 can comprise, in particular, an entry of the local assignment table ZT that is updated on the basis of the first assignment information ZI1. In this case, the second assignment information ZI2 comprises an entry which assigns to the non-adjacent production module PM3 the transfer port PT1, the distance 2 as outlay information AI, the functionality information FI3, the availability information VI3 and the physical constraint BC3 & BC1. The second assignment information ZI2 is transmitted together with the change information CI to the balancing module AM2 of the production module PM2 by the balancing module AM. The change information CI causes the balancing module AM2 to iteratively update the assignment table ZT2 on the basis of the second assignment information ZI2.

By means of receiving first assignment information, updating the respective local assignment table on the basis of the first assignment information received, and forwarding second assignment information, the local assignment tables ZT, ZT1, ZT2 and ZT3 in the production system PS are updated step by step, iteratively and incrementally on the basis of the local assignment tables contained in the respective adjacent production modules. Each production module according to embodiments of the invention compares and updates its own local assignment table with the corresponding local assignment tables of its adjacent production modules in an iterative manner until the local assignment tables no longer change and all transport paths available in the production system PS have been determined. This process ends after a finite number of steps, as a result of which convergence is attained.

At the beginning of such a process, the local assignment table ZT of the production module PM merely records the transfer ports at which products can be received or handed over. For the transfer ports at which products can be received, what is indicated is the transfer ports to which a received product can be transported and what minimum outlay this causes.

The local assignment tables ZT, ZT1, ZT2 and ZT3 in the production system PS are preferably provided with version numbers that are incremented upon a respective change of a respective local assignment table. A respective initial local assignment table preferably acquires the version number 0.

In the local assignment table ZT, an entry is created for each—adjacent or non-adjacent—production module PM1, PM2, PM3, . . . that can be reached from the production module PM. The conveying destinations entered as conveying destinations in the corresponding local assignment tables of the adjacent production modules PM1, PM2 are accepted into these entries. Likewise, the functionalities which are assigned to the conveying destinations in the corresponding local assignment tables of the adjacent production modules PM1, PM2 are assigned to said conveying destinations in the local assignment table ZT. Furthermore, the transport outlay to a respective conveying destination is determined, e.g. as a sum of the transport outlay indicated in the corresponding local assignment table ZT1 or ZT2 of an adjacent production module PM1 or PM2, respectively, and the transport outlay from the production module PM to the adjacent production module PM1 or PM2, respectively.

Furthermore, the local assignment table ZT records the version of the corresponding local assignment table ZT1 or ZT2 of the adjacent production module PM1 or PM2, respectively, on which a respective entry is based. The same entry also indicates an updated version number of the corresponding local assignment table ZT1 or ZT2, respectively, if the latter changes. If a local assignment table in a production module changes, the version number of said local assignment table is incremented and this new version number is entered as new current version number in each case in the local assignment tables of the adjacent production modules. This updating step or iteration step is repeated in the production module PM until, in all of the abovementioned entries of the local assignment table ZT, the version numbers of the corresponding local assignment tables of the adjacent production modules are identical to the current version numbers. This process is performed in a distributed manner by all production modules according to embodiments of the invention in the production system PS and converges after a finite number of updating steps, at least as long as no renewed changes occur in the production system PS. If a change is made to the production system PS, the above process is reactivated and the corresponding changed indications are disseminated step by step by local interaction between adjacent production modules via the production system PS, wherein the version numbers of the local assignment tables are correspondingly incremented.

On account of the substantially self-organized adaptation of the production system PS to changes in the production system PS, said adaptation being controlled in a decentralized manner, said production system can react considerably more flexibly to such changes. If e.g. a production module or a functionality fails, this change is disseminated by the respectively adjacent production modules to the other production modules according to embodiments of the invention of the production system PS and their local assignment tables are correspondingly adapted. In this way, production can be still largely maintained in many cases even after an unforeseen failure of a production module.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A production module for processing or handling a product in a production system having a multiplicity of production modules, comprising:
  a) a product acquisition module for reading in product parameters assigned to the product,
  b) transfer ports for handing over the product to the multiplicity of production modules of the production system that are adjacent to the production module,
  c) an interaction module for allocating a respective adjacent production module to one of the transfer ports,
  d) a data memory for storing a local assignment table, in which conveying destinations that are not adjacent to the production module in the production system are assigned in each case to one of the transfer ports,
  e) a balancing module for iteratively reading in first assignment information of a corresponding assignment table of a first adjacent production module, for iteratively setting up the local assignment table on a basis of the first assignment information read in, and for iteratively forwarding second assignment information of the local assignment table to a second adjacent production module, wherein the balancing module is configured to perform, on account of arriving change information, an iteration step when reading in first assignment information, when setting up the local assignment table and/or when forwarding second assignment information, and
  f) a handover module
    for determining a conveying destination for the product in the production system on a basis of the product parameters read in,
    for selecting a transfer port assigned to the determined conveying destination in the local assignment table and
    for handing over the product via the selected transfer port.

2. The production module as claimed in claim 1, wherein the balancing module is configured to assign a conveying destination indicated in the corresponding assignment table of the first adjacent production module in the local assignment table to a transfer port allocated to said first adjacent production module.

3. The production module as claimed in claim 1, wherein the interaction module is configured dynamically to detect adjacent production modules to which the product can be handed over, and to generate change information on account of such a detection.

4. The production module as claimed in claim 1, wherein the local assignment table contains version information that is changed on account of arriving change information and/or on account of an iteration step when reading in first assignment information, when setting up the local assignment table and/or when forwarding second assignment information, and in that the balancing module is configured, when setting up the local assignment table, to compare the version information thereof with a version of the first assignment information and to update the local assignment table in a manner dependent thereon.

5. A production system comprising production modules as claimed in claim 1.

6. The production module as claimed in claim 1, wherein the first assignment information, the second assignment information and/or the local assignment table assign to a conveying destination a physical constraint that has to be fulfilled by the product on a transport path to said conveying destination, and
in that the handover module is configured to balance the physical constraint with the product parameters read in and, in a manner dependent thereon, to perform the determination of the conveying destination and/or the selection of the transfer port.

7. The production module as claimed in claim 6, wherein the balancing module is configured to link the physical constraint assigned to a conveying destination in the first assignment information with a local physical constraint of the production module and to assign the linked physical constraint to the conveying destination in the local assignment table and in the second assignment information.

8. The production module as claimed in claim 1, wherein the first assignment information, the second assignment information and/or the local assignment table assign to a conveying destination outlay information about a conveying outlay with respect to said conveying destination, functionality information about a functionality of said conveying destination, availability information about an availability of the functionality and/or change information about a change in the functionality or the availability.

9. The production module as claimed in claim 8, wherein the handover module is configured to perform the determination of the conveying destination and/or the selection of the transfer port depending on the outlay information, functionality information, availability information and/or change information assigned to the conveying destination.

10. The production module as claimed in claim 8, wherein the balancing module is configured to assign a conveying destination indicated in corresponding assignment tables of a plurality of first adjacent production modules, on a basis of outlay information respectively assigned therein, to a transfer port in the local assignment table that is allocated to an adjacent production module with a minimum conveying outlay with respect to said conveying destination.

11. The production module as claimed in claim 8, wherein the balancing module is configured to create, for a conveying destination indicated in corresponding assignment tables of a plurality of first adjacent production modules, a plurality of entries in the local assignment table with respectively assigned outlay information, and
in that the handover module is configured to select a transfer port that is allocated to an adjacent production module with a minimum conveying outlay with respect to said conveying destination.

12. The production module as claimed in claim 8 wherein the availability information comprises a time indication about a period of time in which the functionality is available or about a point in time of a change in the functionality or the availability.

13. The production module as claimed in claim 12, wherein the outlay information assigned to the conveying destination comprises a transport time with respect to said conveying destination, and in that the handover module is configured to perform the determination of the conveying destination and/or the selection of the transfer port depending on the time indication and the transport time.

14. A method for operating a production module as claimed in claim 1, the method comprising:
a) reading in production parameters assigned to a product,
b) allocating production modules adjacent to the production module in each case to a transfer port of the production module that is provided for handing over the product to the adjacent production module,
c) assigning conveying destinations that are not adjacent to the production module for the product in each case to one of the transfer ports in a local assignment table,
d) iteratively reading in first assignment information from a corresponding assignment table of a first adjacent production module,
e) iteratively setting up the local assignment table on the basis of the first assignment information read in,
f) iteratively forwarding second assignment information from the local assignment table to a second adjacent production module,
g) determining a conveying destination for the product on the basis of the product parameters read in,
h) selecting a transfer port which is assigned to the determined conveying destination in the local assignment table, and
i) handing over the product via the selected transfer port.

15. A computer program product, comprising a computer readable hardware storage device having computer readable program code stored therein, said program code executable by a processor of a computer system to implement a method for a production module as claimed in claim 1.

* * * * *